(12) United States Patent
Graham et al.

(10) Patent No.: US 11,861,580 B2
(45) Date of Patent: *Jan. 2, 2024

(54) SYSTEM FOR PROCESSING A TRANSACTION BY A USER AT A TRANSACTION POINT

(71) Applicants: Robert William Graham, Springboro, OH (US); David B Johnson, Mason, OH (US)

(72) Inventors: Robert William Graham, Springboro, OH (US); David B Johnson, Mason, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/826,179

(22) Filed: Mar. 21, 2020

(65) Prior Publication Data

US 2020/0219080 A1 Jul. 9, 2020

Related U.S. Application Data

(63) Continuation-in-part of application No. 13/730,999, filed on Dec. 29, 2012, now Pat. No. 10,600,128.

(60) Provisional application No. 61/730,815, filed on Nov. 28, 2012.

(51) Int. Cl.
| | |
|---|---|
| *G06Q 40/00* | (2023.01) |
| *G06Q 20/40* | (2012.01) |
| *G06Q 20/20* | (2012.01) |
| *G06Q 10/10* | (2023.01) |
| *G06Q 20/34* | (2012.01) |
| *G06Q 40/12* | (2023.01) |
| *G06Q 20/32* | (2012.01) |

(Continued)

(52) U.S. Cl.
CPC ......... *G06Q 20/204* (2013.01); *G06F 16/258* (2019.01); *G06Q 10/10* (2013.01); *G06Q 20/3224* (2013.01); *G06Q 20/341* (2013.01); *G06Q 20/40* (2013.01); *G06Q 40/12* (2013.12); *G06Q 30/0203* (2013.01)

(58) Field of Classification Search
CPC .... G06Q 20/204; G06Q 10/10; G06Q 20/341; G06Q 40/12; G06Q 20/3224; G06Q 20/40; G06Q 30/0203; G06Q 20/3274; G06F 16/258
See application file for complete search history.

(56) References Cited

U.S. PATENT DOCUMENTS

| | | | | |
|---|---|---|---|---|
| 2009/0150265 A1* | 6/2009 | Keld | ............ | G06Q 20/105 |
| | | | | 705/30 |
| 2012/0144461 A1* | 6/2012 | Rathbun | ............ | G06Q 20/4014 |
| | | | | 726/5 |

* cited by examiner

*Primary Examiner* — Fahd A Obeid
*Assistant Examiner* — Reva R Moore
(74) *Attorney, Agent, or Firm* — R. William Graham

(57) ABSTRACT

A system for processing a transaction by a user at a transaction point comprising: a data processing module configured to generate a transaction signal when an initiation of the transaction at a POST device of a transaction point by the user using a transaction initiator is detected, wherein the transaction signal comprises a transaction data; a data delivery module configured to transmit the transaction data from the POS device to a remote processor and optionally to a secondary computer based device of the user; a tagging module configured to enable the user to tag the transaction data when a prompt is displayed on the hand held computer based device; and a report generation module configured to generate a report corresponding to any client selected by the user through the hand held computer based device of the user.

11 Claims, 9 Drawing Sheets

(51) Int. Cl.
*G06F 16/25* (2019.01)
*G06Q 30/0203* (2023.01)

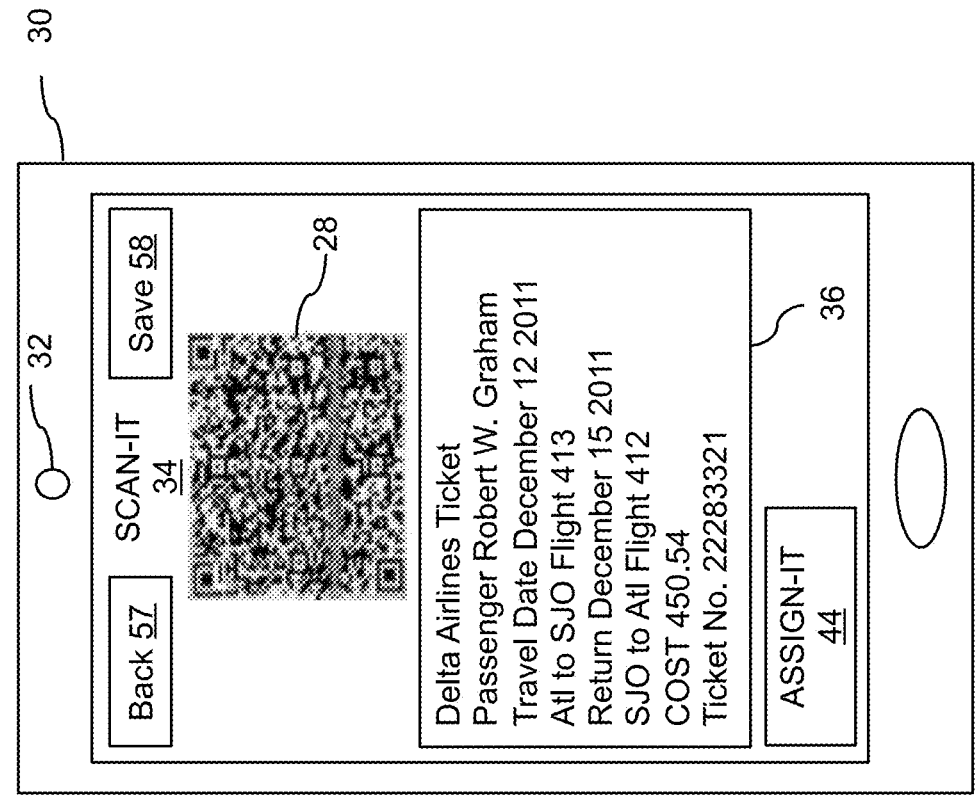
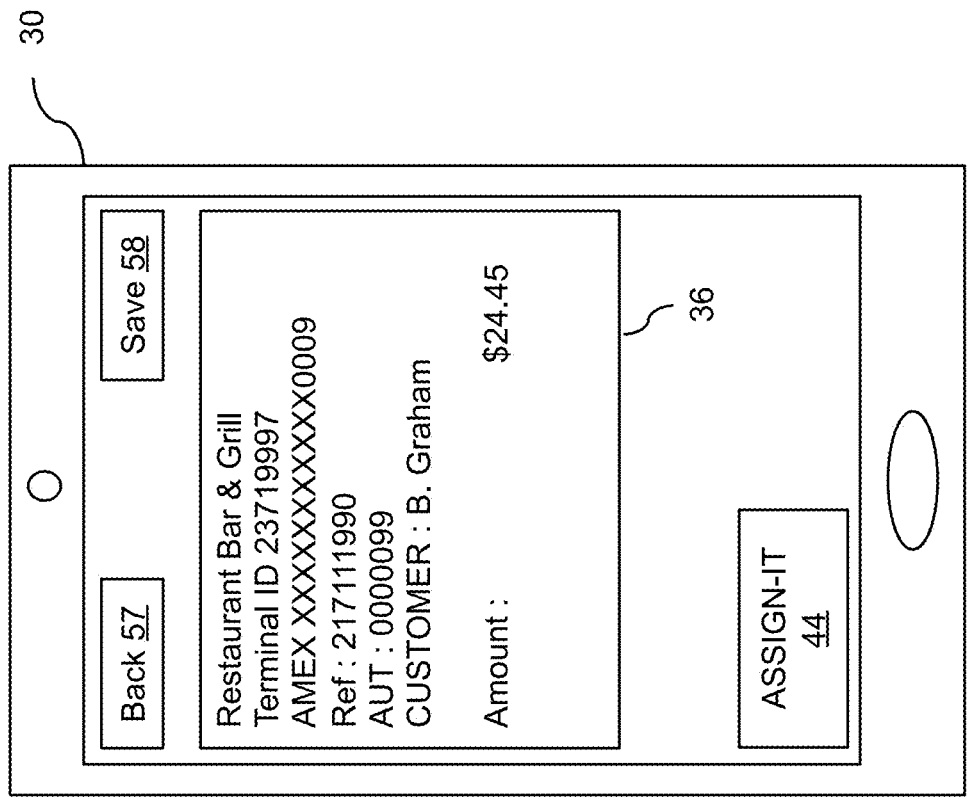
FIG. 3B
FIG. 3A

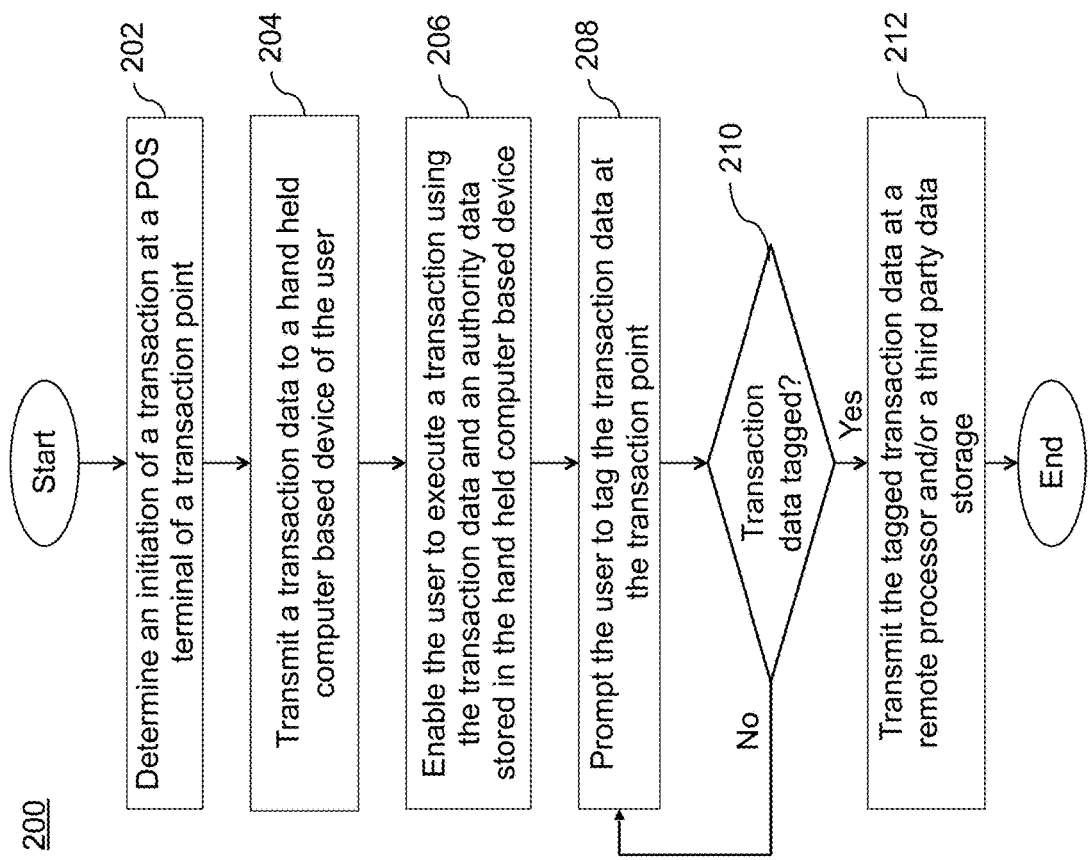

SYSTEM FOR PROCESSING A
TRANSACTION BY A USER AT A
TRANSACTION POINT

This application is a continuation-in-part of application Ser. No. 13/730,999 filed Dec. 29, 2012, which claims the benefit of U.S. Provisional Patent Application Ser. No. 61/730,815, filed on Nov. 28, 2012, the entire content of which is hereby incorporated by reference in its entirety.

FIELD OF INVENTION

The invention is directed to an improved system for processing a transaction by a user at a transaction point. More particularly, the invention is directed to a system and process for processing a transaction by a user at a transaction point employing in part a computer based device at the point of transaction, and a hand held computer.

PRIOR ART

Other prior systems typically employ a device to conduct a transaction at a point of sale processor system (POS). This can be done with aid of a biometric, credit or smart card, smart device for example, which enables the transaction. What happens is, a transaction is performed with a computer based device and the data signals are exchanged between the POS and a merchant system for example wherein authorization data is exchanged.

While such systems for enabling transactions exist, they did not provide an adequate system for a computer based device at the point of sale to receive data and thereafter manipulate the same. For example, one application or current method of conducting a transaction includes using a device to enable a purchase at a point of sale. Subsequent to this, tracking expenses typically includes gathering various receipts as they are incurred from the inception of a business trip, for example, and then manually entering each of the costs into a spreadsheet format using a computer or hand writing them and then stapling receipts to the spreadsheet or employing a scanner to scan in the receipts thereby digitally recording the images of the same. This, however, is a lengthy process and requires entry of the raw data in any event.

There have been some systems which have improved on such tracking by providing an image scanning device that takes an image of receipts and uses optical character recognition software to recognize data and provide the data back in a usable form. However, many times the software is incapable of recognizing such data and/or converting such data in a useful way, particularly when traveling abroad and dealing with foreign currency exchange. The applicants prior invention to which this application claims benefit improved upon such systems.

The instant invention substantially reduces workload associated with such prior techniques as well as provides other applications for prompting a user at a point of transaction to tag data and store locally and remotely.

SUMMARY OF THE INVENTION

As used in the instant invention, POST will refer to a Point of Sale or Transaction requiring authorization of transaction information data.

It is an object to improve processing a transaction by a user at a transaction point.

It is another object to provide a system for processing a transaction by a user at a transaction point.

It is still another object to provide a system for processing a transaction by a user at a transaction point for prompting the user at the point of transaction to tag data and optionally store locally and/or remotely transformed tagged data.

Accordingly one aspect of the invention is directed to a system for processing a transaction by a user at a transaction point. The invention employs a device for initiating a transaction at a point of sale processor. For example, the device can include a credit card, biometric device, a smart device for initiating a payment transaction at a store or a merchant site or a website. The system includes a transaction point that is equipped with a processor, the processor having an electronic communication device therewith (e.g., electronic Internet connection, Bluetooth®, a near field communication device, or an optic device) which generates an electronic signal transaction information data. The processor can also preferably include a media (in the form of a media display or print out) wherein upon a purchase transaction being made at the transaction point, which on the media (e.g. a receipt) and includes details of the transaction, such as a location, a product or service purchased, an amount, a date, a time, etc.

The processor disposed at the transaction point is configured to detect an initiation of the transaction by the user and generate transaction information data corresponding to the transaction, a communication device associated with the processor is configured to transmit the transaction information data, and a remote processor and/or a local processor is configured to receive the transaction information data and store the transaction information data in a database. Processor device at the transaction point receives the transaction information data from the communication device, configured to store transaction authorization data, enable the transaction at the transaction point based on the transaction information data and the transaction authorization data, automatically display and prompt a user on the processor device at the transaction point for tagging the transaction data at the transaction point, which in a preferred embodiment can include tagging as one of a personal or a business with tagging to a particular client. The processor device can store and/or transmit the user input to the remote processor and/or a local processor, wherein the remote processor and/or a local processor is further configured to tag the stored transaction information data in the database based on the user input, e.g., as one of a personal transaction or a business transaction and/or tagging with additional data, thereby transforming transaction information data where stored such as on the remote database and/or on a local database through electronic communication therebetween.

As mentioned, an exemplary processor device can be a hand held smart device which includes application, transaction software, which is equipped with a complementary communication device, hardware for receiving authorization for a transaction from the user, for example a near field communication device, an optic device or a card reader, hardware and software for optionally scanning the computer readable code thereby gathering the transaction information data, wherein the processor device can store data locally (e.g., on the smart device) and/or transmit the same to a remotely located processor (e.g., merchant processor and associated database). It is also contemplated that the processor device can provide credit authorization data in other manners such as, through a display screen, a camera, and employ a credit card or a smart card device at the transaction point. The expense transaction software is preferably equipped to enable tagging of data into a file, such as data regarding the transaction, or enables associating data with a particular transaction.

In another embodiment, the invention is directed to a system for processing a transaction by a user at a transaction point. The system includes:

a transaction point which is equipped with a processor, transaction software operably associated with the processor, a near field communication device, where upon a purchase transaction being made at the transaction point, the processor utilizes the near field communication device and transaction software to generate an electronic signal including transaction information data pertaining to the purchase; and a hand held computer based device which includes an expense transaction software equipped with a near field communication device and is operably connected to receive the electronic signal and the transaction software obtains the transaction information data from the electronic signal for one of storing locally on the hand held computer based device or transmitting the transaction information data to a remotely located processor. In another aspect of the invention, there is provided a hand held computer based device which includes an expense transaction software equipped with a near field communication device to receive the electronic signal and wherein the transaction software obtains the transaction information data for either storing locally on the hand held computer based device or transmitting the transaction information data to a remotely located processor.

Another embodiment is directed to a system for processing a transaction by a user at a transaction point. The system includes:

a transaction point which is equipped with a processor, transaction software operably associated with said processor, a media for displaying transaction information data in a computer readable image code, whereupon a purchase transaction being made at said transaction point, said processor utilizes said transaction software to generate on said media said computer readable image code; and a computer based device which includes an expense transaction software equipped with an optic device and operably connected therewith, and upon initiating the transaction software application, the optic device is employed for scanning the computer readable image code thereby gathering the transaction information data therefrom and one of storing locally on the computer based device and transmitting the transaction information data to a remotely located processor whereby the computer readable image code which can be converted into human readable format.

Another embodiment is directed to a transaction system for processing a transaction by a user at a transaction point, the system comprising: a data processing module configured to generate a transaction signal when an initiation of the transaction through a device at a transaction point by the user using a transaction initiator is detected, wherein the transaction signal comprises a transaction data; a data delivery module configured to transmit the transaction data from the POST computer based device to a remote processor (and optionally to a hand held computer based device of the user using a NFC device associated with the POST device); and a tagging module configured to enable the user to tag the transaction data when a prompt is displayed on either the POST computer based device or the hand held computer based device of the user. There can also be a report generation module configured to generate a report corresponding to any client selected by the user through the hand held computer based device of the user.

Another embodiment is directed to a transaction system for processing a transaction by a user at a transaction point, the transaction system comprising: a data processing module configured to generate a transaction signal when an initiation of the transaction at a transaction point by the user using a POST computer based device, wherein the transaction signal comprises a transaction data such as, a location of a transaction, a coupon detail, a referral code detail, a terminal identifier (ID), a product and/or service purchased, a merchant information, an amount, a date, a time, and so forth; a data delivery module configured to transmit the transaction data from the POST computer based device to a remote processor for authorization and transmitting the authorization and transaction data back to the POST hand held computer based device; a prompting module for prompting the user for tagging the data authorized transaction data, a tagging module configured to enable the user to tag the transaction data when a prompt is displayed on the POST hand held computer based device of the user and a storing module for storing the tagged data. Additionally, there is a report generation module configured to generate a report corresponding to any client selected by the user.

Another embodiment is directed to a method for processing a transaction by a user at a transaction point, the method comprising steps of: detecting an initiation of a transaction at a transaction point using POST computer based device by the user using a transaction initiator; generating a transaction data corresponding to the initiated transaction; transmitting the generated transaction data from the POST computer based device to a remote processor for authorization and transmitting the authorization data and transaction data back to the POST computer based device; enabling a transaction at the POST computer based device of the transaction point using the transaction data and an authorization data; prompting the user on the POST computer based device to tag the transaction data at the transaction point. In this regard, the prompting can be for one of a personal transaction or a business transaction with tagging to a particular client, or to submit answers corresponding to a plurality of survey questions at the transaction point. There is also provided for transmitting the tagged transaction data to the remote processor, wherein the remote processor is further configured to tag, transform, and store such transaction data in a database as so tagged, e.g., one of a personal transaction or a business transaction, thereby transforming the transaction data on the database through an electronic communication therebetween.

BRIEF DESCRIPTION OF THE DRAWINGS

FIG. 3A depicts a hand held device of the invention showing a third screen.

FIG. 3B depicts a hand held device of the invention showing a fourth screen.

FIG. 9 depicts a flowchart of a process for tagging a transaction data using the reporting system, according to an embodiment of the present invention.

DETAILED DESCRIPTION OF THE INVENTION

Figure 7:
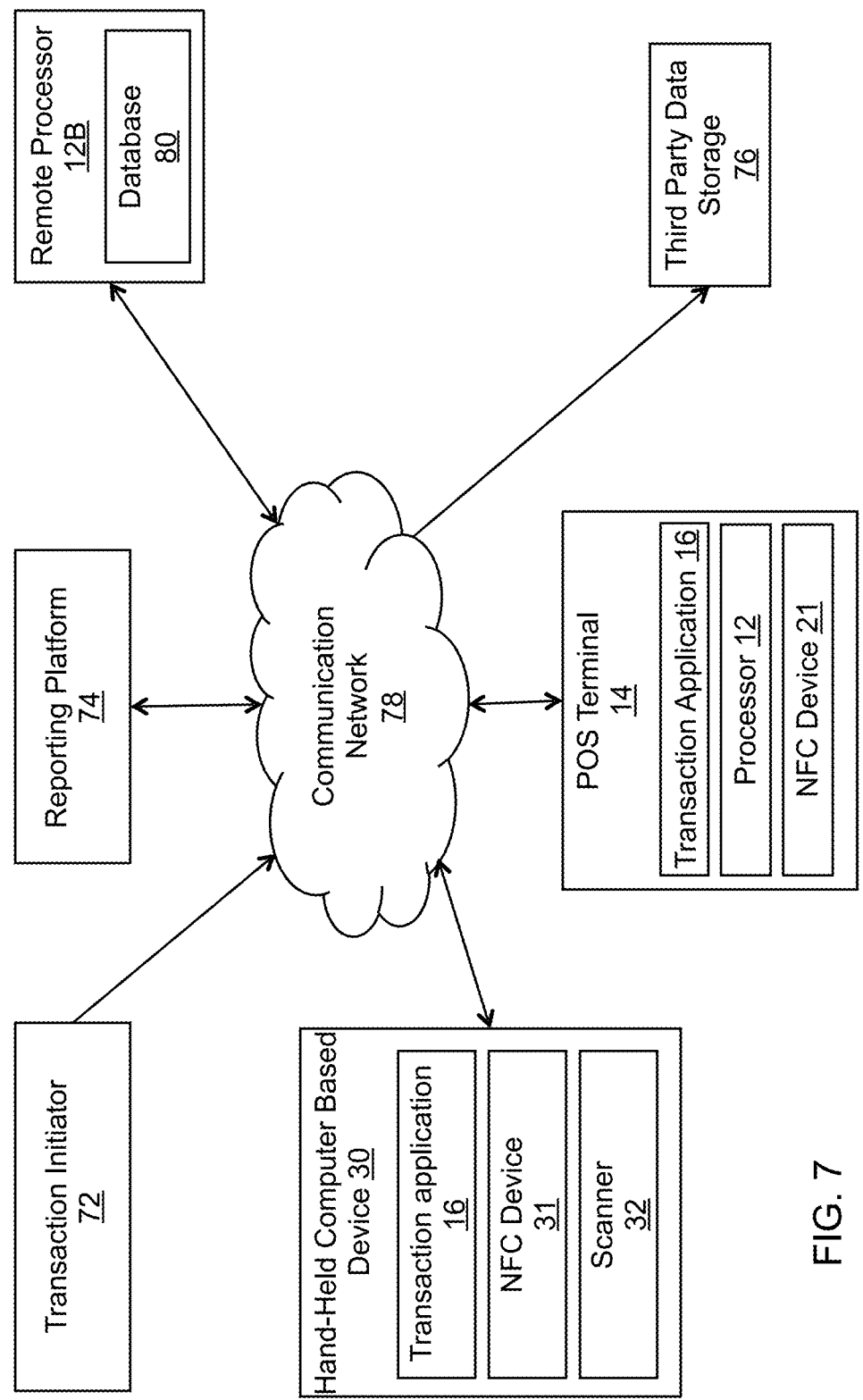
FIG. 7 depicts a block diagram of a reporting system, according to embodiments of the present invention.

Referring now to the drawings, the invention is directed to a system for tracking expenses and is generally referred to by the numeral 10. The system 10 takes place at a transaction point T which is equipped with a processor 12 (which as seen in the drawings can reside at the transaction point T within a computer based device 14, such as a register or kiosk or a local computer, a tablet, or a smart device (30), for example,) and be remotely operably associated with a computer based device (12A). By way of example, the computer based device 14 can include a transaction software 16 on a memory 18 thereof or be operably associated with transaction software of the processor 12A. Computer based device 30 can likewise equipped with hardware and a transaction software 17 to cooperate with the transaction software 16. In one aspect of the invention, the computer based device or processor 14 can be equipped with a near field communication (NFC) device 21, for transmitting transaction information data related to a purchase of a good or service for example. In this embodiment, no visible media form is required, rather, the data is transmitted electronically via near field communication. It is contemplated that some other form of secure electronic signal can be used in the alternative to near field communication. The computer based device 14 is also operably connected to the Internet to obtain and send necessary transaction information data related to the transaction. As seen in FIG. 7, for example, the computer based device 14 (or 30) can include hardware and software for receiving credit card data, smart card data and/or biometric data 15, (e.g., a smart phone, a smart watch, or smart glasses) some or all of which can be part initiation device for at least part of the transaction data.

In an embodiment or in addition to the above, a media data 20 can be transformed in form to be displayed on a media display 22 and/or via printer 24 on paper 26, e.g. thermal paper can be employed to convey at least part of the transaction information data. The transaction point T can be any retail point, contemplating on-line as well as conventional retail markets (e.g., gas station, retail store, food and beverage provider, travel service provider, bank, atm, etc.).

Upon a transaction being initiated, e.g., a purchase transaction being made at the transaction point T, the processor 12 utilizes the transaction software 16 to generate an electronic signal including the transaction information data. In this example, the transaction data can include item information data, date data, time data, merchant data, purchaser data, payment data (e.g., account data, credit card data, smart card data and/or biometric data 15).

Remote server 12A computer likewise is equipped with hardware and transaction software 19 to cooperate with transaction software 16 and/or 17. An electronic signal is transmitted to the remote server 12A including transaction information data, where upon receiving such signal, transaction software 19 in an aspect of the invention generates an automated prompting signal to at least one of the computers 14 and/or 30 at the transaction point T requiring the receiving computer 14/30 to tagging or manipulate the transaction data. For purposes of the invention, "tagging" can refer to marking, editing, adding or annotating the transaction information data. For example, the tagging can include the modification of transaction information data to include an increase or decrease in a transaction amount data, such as additional service fee data. Once computer 14 and/or 30 has so tagged the transaction data, the processor device of the computer 14 and/or 30 can store and/or transmit the user input "tagged" data to the remote processor of server computer 12A, wherein the remote processor server computer 12A is further configured to transform and tag the stored transaction information data in a database based on the user input and/or store the transformed tagged data in a local database or remote database 35. This can be, for example, tagged data transformed as one of a personal transaction or a business transaction, thereby transforming transaction information data on the remote database 35 achieved through electronic communication therebetween.

Figure 5:
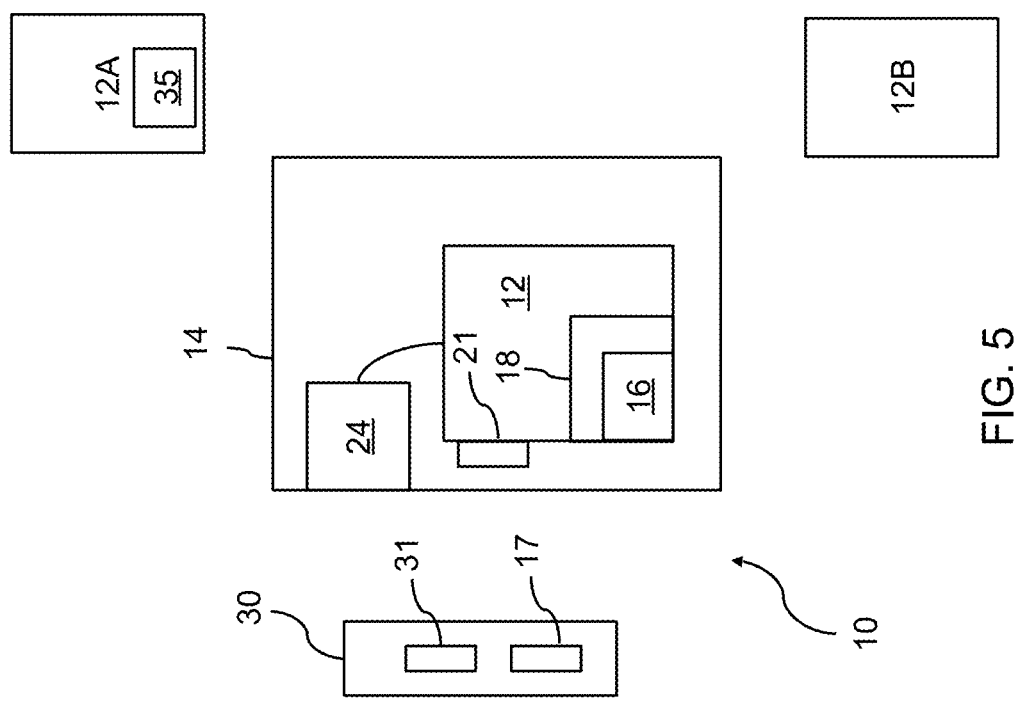
FIG. 5 depicts a schematic of one aspect of the instant invention.
Figure 6:
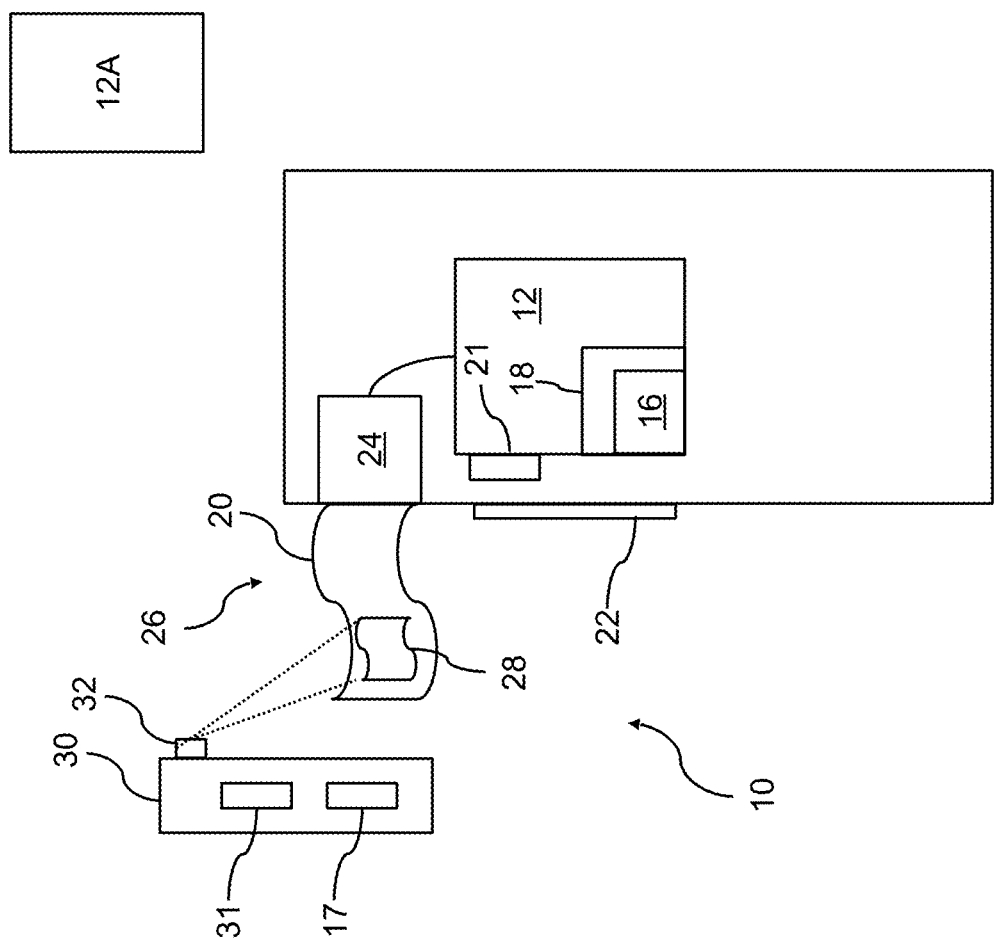
FIG. 6 depicts a schematic of one aspect of the instant invention.

In one aspect of the invention, computer 14 and 30 can communicated wirelessly, e.g., via NFC, for direct use by hand held computer based device 30 having a NFC device (chip) 31 as seen in FIG. 5 and/or used by computer based device 14 for displaying on media data 20 (here shown on paper 26 but can be on LCD panel 22 or the like) for subsequent use by hand held computer based device 30 as seen in FIG. 6.

In yet another aspect of the invention, as illustrated in FIG. 7, computer 14 can be used for transmitting and receiving transaction data 15, such as credit card data, smart card data or biometric data directly with the aid of wireless communication of computer based device 30. Optionally, computer 30 can be used for transmitting and receiving transaction data 15, such as credit card data, smart card data or biometric data directly with the aid of wireless communication of computer based device 14.

The transaction system 10 for processing a transaction by a user at a transaction point T includes a data processing module configured to generate a transaction signal when an initiation of the transaction through a POST computer based device (e.g., data processing module on computer based device 12) at a transaction point T by the user using a transaction initiator is detected, wherein the transaction signal comprises transaction information data. A data delivery module (e.g., data delivery module on computer based device 12) configured to transmit the transaction data from the POST computer based device 12 to a remote processor 12A (and optionally to a hand held computer based device 14/30 of the user using a NFC device associated with the POST device). A tagging module (e.g., tagging module on computer based device 14/30) configured to enable the user to tag the transaction data when a prompt is displayed on either computer based device 14/30. There can also be a report generation module configured to generate a report corresponding to any client selected by the user through the computer based device 14/30 of the user.

As mentioned, the transaction signal can include transaction data such as, a location of a transaction, a coupon detail, a referral code detail, a terminal identifier (ID), a product and/or service purchased, a merchant information, an amount, a date, a time, and so forth. The invention includes a prompting module which can be in the transaction software for prompting the user for tagging the transaction information data, e.g., post authorization. A tagging module can be provided in the transaction software configured to enable the user to tag the transaction information data when a prompt is displayed on the POST computer based device (e.g., 14, 30) of the user. A storing module is provided for storing the tagged data either remotely or locally. A report generation module is provided and configured to generate a report corresponding to any client selected by the user.

A method for processing a transaction by a user at a transaction point contemplates the steps of detecting an initiation of a transaction at a transaction point using POST computer based device by the user employing a transaction initiator device; generating transaction data corresponding to the initiated transaction; transmitting the generated transaction data from the POST computer based device to a remote processor for authorization and transmitting the authorization data and transaction data back to the POST computer based device; enabling a transaction at the POST computer based device of the transaction point using the transaction data and an authorization data; prompting the user on the POST computer based device to tag the transaction data at the transaction point. In this regard, the prompting can be for one of tagging as a personal transaction or a business transaction with tagging to a particular client, or to submit answers corresponding to a plurality of survey questions at the transaction point. Subsequently, provided is a step of transmitting the tagged transaction data to the remote processor, wherein the remote processor is further configured to tag and transform and store such transaction data in a database as so tagged, e.g., one of a personal transaction or a business transaction, thereby transforming transaction data on the database through an electronic communication therebetween.

It is contemplated that contemporaneously with the transaction information data transmission, there can be secondary data transmitting in the automated prompt which includes data from the remote server computer based device 12A such as survey data and/or coupon data onto the processor 12 and/or 14 which is required to be tagged by the user.

Hand held computer based device 30, such as a smart phone or tablet, for example, can preferably include a complementary secure communication device, such as near field communication (NFC) device 31, and further includes transaction software 17 which can be in the form of an application used by the user on the smart phone 30, for example. The transaction software 17 resides on the device 30 and can be equipped as a persistent overlay of the application such that the device 30 alerts or prompts the user when receiving transaction information data and prompting signal from a remote device, e.g., 12A. Similarly, this can be similarly situation for transaction software 16 on computer based device 14. In the case of the computer based device 14 and/or hand held computer based device 30 which can optionally include NFC devices, the transaction software 16/17 is initiated by an invitation device and upon the transaction information data electronic signal being detected on the computer based device 14/30.

In one application, the data 15 and/or media data 20 can be transformed as a computer readable code, e.g., as a bar or QR code 28 which includes details of the transaction information data, such as location, product or service purchased, merchant information, amount, date, time, card data, or biometric data, etc. By "computer readable code" inventor contemplates a readable code employing electronic computer based device. In one example, this can be a computer generated coded image, such as a QR code or Bar Code, or electronic signal, which has taken the real time transaction data and puts the real time transaction data into such format to enable a computer (such as hand held computer based device 30) to use high speed data manipulation.

Figure 1:
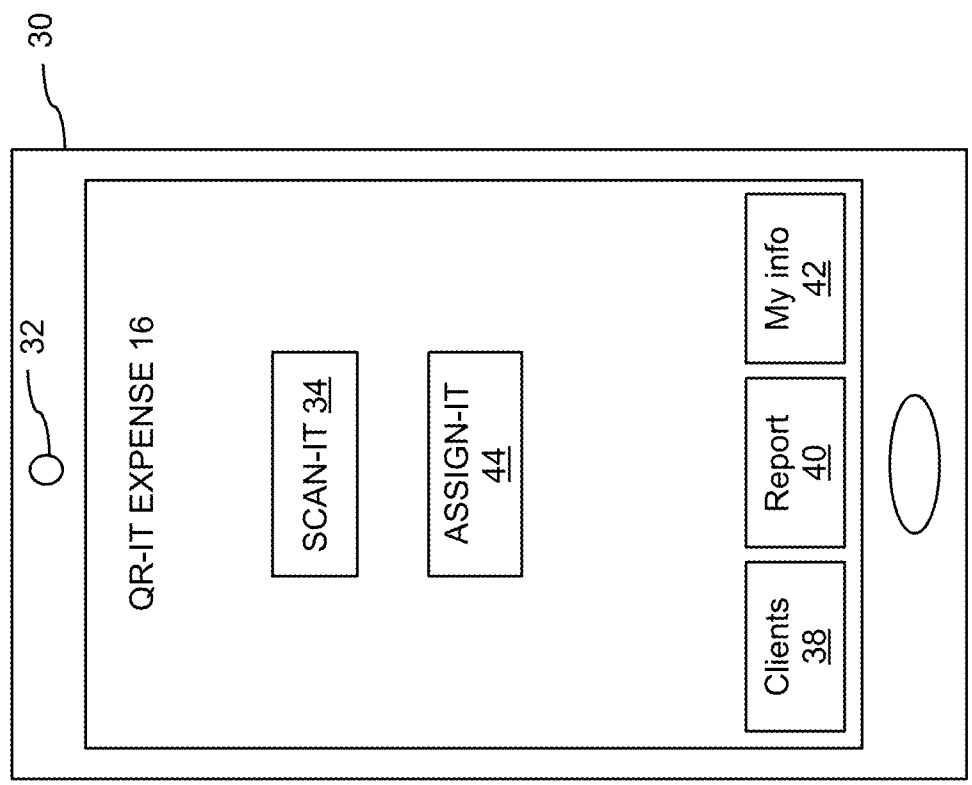
FIG. 1 depicts a hand held device of the invention showing a first screen.

Computer based device 14/30 can also be equipped with an optic device 32 and works together with expense transaction software 16,17 such that upon initiating the transaction software 16/17 application on the computer based device 14/30, the transaction software 16/17 gathers the transaction information data (e.g., from the electronic signal (NFC) or from the code 28 using the optic device 32, for example, which can be employed for scanning the code 28 by touching (initiating) "Scan-it" button 34 on screen of device 30 as illustrated in FIG. 1 and by positioning the code 28 in the correct position and field of view of the optic device 32) and can store locally on the computer based device 14/30 and/or transmit the same to a remotely located processor 12A. The transaction information data can be converted into a human readable form 36 (e.g., as seen in FIGS. 3A and 3B) either by the expense transaction software 16/17 residing on the computer based device 14/30 or by complementary transaction software residing on remote processor 12A, for printing or later retrieval. The computer based device 14/30 can preferably include transaction authorization data, such as credit card information data, which is transmitted, directly via LAN, wireless communication (e.g., via NFC device 31 to NFC device 21, cellular or cable) or Internet for purpose of making a transaction, such as a purchase or other exchange transaction.

In one aspect of the application, the data 15 and/or media data 20 can be transformed as a computer readable code, e.g., as a bar or QR code 28 which includes details of the transaction information data, such as location, product or service purchased, merchant information, amount, date, time, card data, or biometric data, etc. By "computer readable code" inventor contemplates and readable code employing electronic computer based device. In one example, this can be a computer generated coded image, such as a QR code or Bar Code, or electronic signal, which has taken the real time transaction data and puts the real time transaction data into such format to enable a computer (such as hand held computer based device 30) to use high speed data manipulation.

Figure 2:
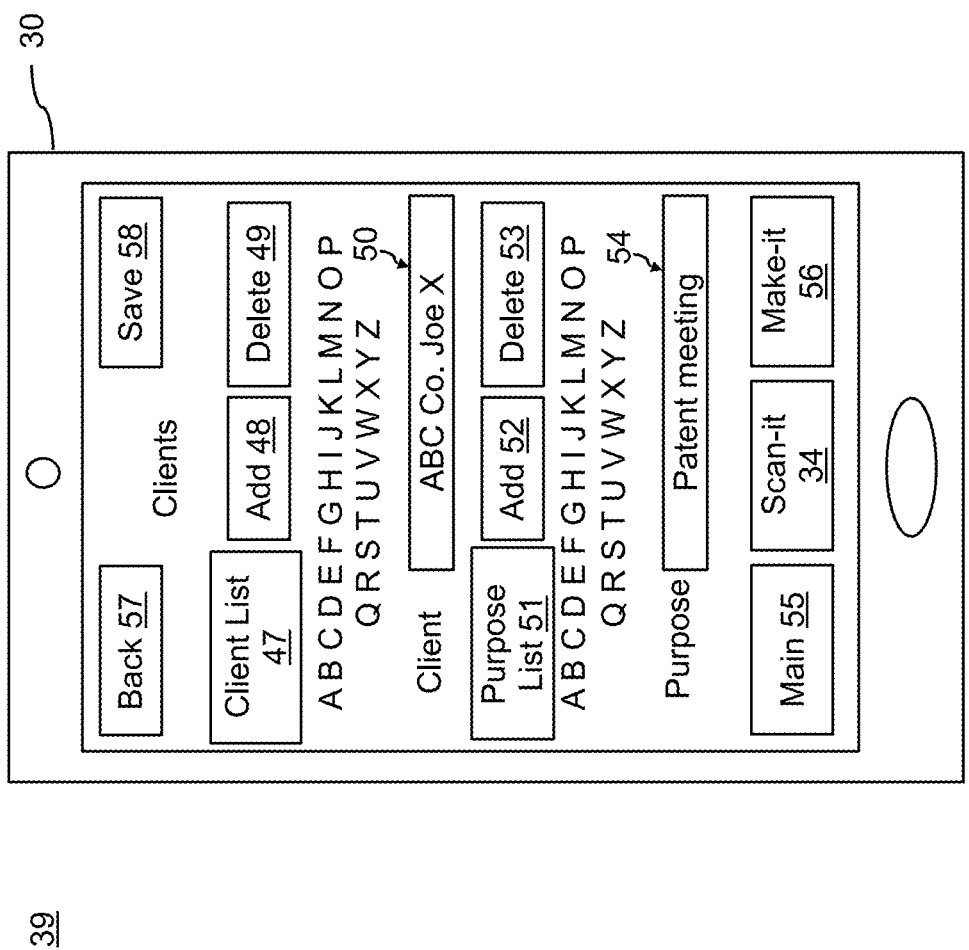
FIG. 2 depicts a hand held device of the invention showing a second screen.

As an example, the transaction software 17 provides for a client's button 38, by touching (initiating) brings up a screen as depicted in FIG. 2. Herein, the user can add/delete clients and purposes of expense to be tracked, and these can be stored in manner to be later retrieved and used at a later date for purposes of assigning the transaction information data 36 to a particular client and stated purpose. The human readable format data can be printed or stored as desired by the user. The transaction software 17 can store and log all such data in a sorted manner to enable quick and easy viewing of such data by client, purpose, date, merchant, good and/or service by touching (initiating) the report button 40 which brings up a screen enabling the viewing of such data and printing, e-mailing or exporting the same in a variety of report formats. A "my info" button 42 is also provided wherein the transaction software 17 which upon touching (initiating) enables entry of user personal information for tracking expenses, such as your name, company/ companies, address(es), telephone number(s), e-mail(s), etc., and can preferably be automatically obtained from user information from the computer based device (e.g., smart phone) 30 and which can be edited.

Once the transaction information data is obtained via electronic signal electronic signal or via code 28 scanned (FIG. 3A or 3B showing transaction information data 36), then the user is automatically prompted (a screen 46 seen in FIGS. 4A and 4B) to tag the data, where "tagging" refers to marking, editing, adding or annotating the transaction information data.

Figures 4A, 4B:
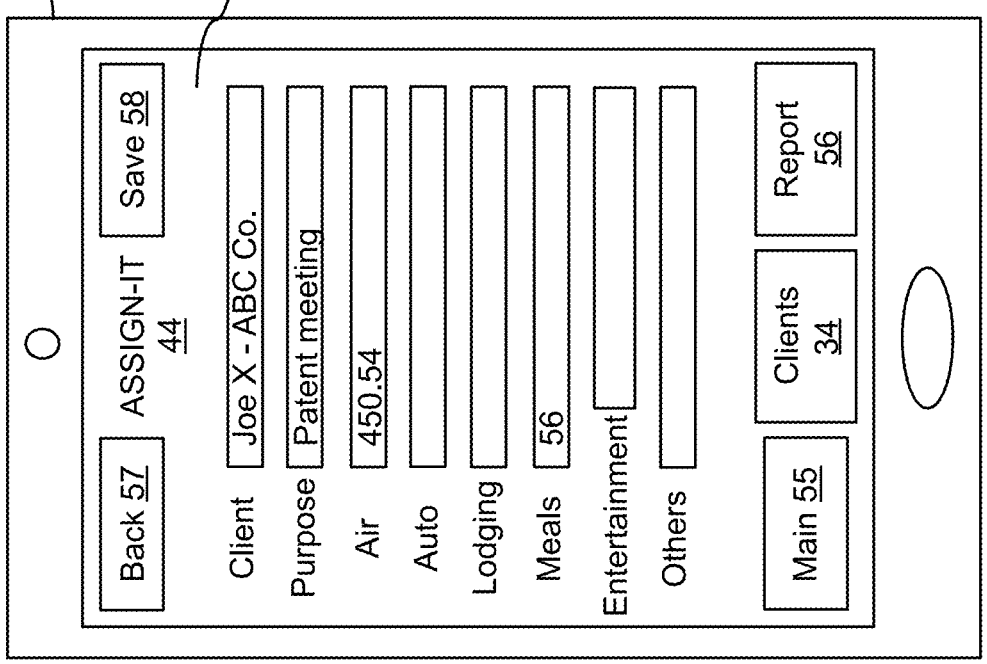
FIG. 4A depicts a hand held device of the invention showing a fifth screen.
FIG. 4B depicts a hand held device of the invention showing a sixth screen.

For example, the user can manually assign the expense by touching the "Assign-It" button 44 which bring up screen 46 seen in FIGS. 4A and 4B. The transaction information data 36 is manipulated back to human readable form and the screen permits editing, addition, deletion of various other items expenses. In the event, no computer readable code is provided for scanning, this button enables manual entry/tagging of data for the item.

The transaction software 17 is also preferably equipped enable input of data into a file, such as annotated or tagged data regarding the transaction, or enables associating personal or client data with a particular transaction. It is further contemplated that the transaction software 17 instant invention can be fully compatible to import/export data, such as client data, company and personal data, and transaction information data, report data, etc., for example, with such programs as Quicken®, QuickBooks® and Peachtree® accounting, for example, or other accounting programs. It is also envisioned that the transaction data and prompting signal received from the remote server 12A and transaction software 19 provides for additional and or independent data which can include survey data and coupon data as part of the transaction data.

Another aspect of the invention is as follows. It is contemplated that the transaction data on both phone and processor, method for performing transaction can be implemented via a suitable electronic method NFC, Bluetooth, optic device, etc. The invention can operate as a middle layer system, independent of method of transaction, but after a point in which transaction data is complete, thus the instant invention provides software computer based system which is initiated to perform the categorization of expense items from the transaction information data and permit tagging, e.g., editing or noting of data for later use, such as reporting. The middle layer system of the invention can communicate with a bank and/or credit card/debit card transaction database to streamline the data for its end of period (e.g., month or year) reporting use.

In this regard an example is as follows: the smart phone is equipped with American Express® Credit card information and the NFC provides a transaction to be completed where the processor at the transaction point communicates with remotely located processor of American Express to approve the transaction. American Express processor captures the transaction information data and categorizes the transaction information by date, time, merchant type, goods/services, etc. The transaction software of the instant invention initiated the smart phone permits the tagging of such transaction information data and can optionally locally store on the phone using transaction software or transmit data to the remotely located processor of American Express for further categorization using the tagged data. For example, it can include a note concerning the transaction, a client/matter to be assigned with the transaction information data. Optionally, the American Express can categorize said transactional data and send to the smart phone real time and permit tagging such data which has been sorted using categorization done by American Express.

A typical transaction information data from American Express will appear "12/01/2012 Alamo Car Rental NY $125" and the transaction software will receive the information and be prompted to tag the transaction information data at the transaction point as "Business or Personal" and then permitted to tag further data such as purpose of the meeting, or purchase and tag it to a particular client/company. This data can be stored locally on the phone and/or on the remotely located processor of American Express, for example. Thus, all credit card transactions can be quickly and conveniently recorded as business or personal expenses. In addition, cash transactions can also be recorded by the transaction expense software of the invention, thereby providing the ability to provide a detailed expense report.

FIG. 7 depicts a block diagram of a reporting system 70, according to embodiments of the present invention, which in one example can be a mobile reporting system but could be a kiosk system as well. The system 70 may comprise a transaction initiator 72, a hand held computer based device 30, a Point Of Sale (POS) computer based device 14, a reporting platform 74, a remote processor 12B, and a third party data storage 76. The transaction initiator 72, the hand held computer based device 30, the POST computer based device 14 (interchangeably referred to as the computer based device 14), the reporting platform 74, the remote processor 12B and the third-party data storage 78 may be connected through a communication network 78, according to embodiments of the present invention.

The communication network 78 may include a data network such as, but not limited to, the Internet, Local Area Network (LAN), Wide Area Network (WAN), Metropolitan Area Network (MAN), etc. In some embodiments of the present invention, the communication network 78 may include a wireless network, such as, but not limited to, a Bluetooth, a Near Field Communication (NFC), an infrared, a cellular network and may employ various technologies including an Enhanced Data Rates For Global Evolution (EDGE), a General Packet Radio Service (GPRS), etc. In some embodiments of the present invention, the communication network 78 may include or otherwise cover networks or sub-networks, each of which may include, for example, a wired or a wireless data pathway. Examples of the communication network 78 may further include, but are not limited to, a Personal Area Network (PAN), a Storage Area Network (SAN), a Home Area Network (HAN), a Campus Area Network (CAN), a Virtual Private Network (VPN), an Enterprise Private Network (EPN), Internet, a Global Area Network (GAN), and so forth. Embodiments of the present invention are intended to include or otherwise cover any type of network, including known, related art, and/or later developed technologies to connect components of the reporting system 70. According to an embodiment of the present invention, the transaction initiator 72, the hand held computer based device 30, the POST computer based device 14, the reporting platform 74, the remote processor 12B, the third party data storage 76 may be configured to communicate with each other by one or more communication mediums connected to the communication network 78. The communication mediums may include, but are not limited to, a coaxial cable, a copper wire, a fiber optic, a wire that comprise a system bus coupled to a processor of a computing device, and so forth. Embodiments of the present invention are intended to include or otherwise cover any type of communication medium, including known, related art, and/or later developed technologies.

The transaction initiator 72 may be a device configured to initiate a transaction at the POST computer based device 14, according to an embodiment of the present invention. The transaction initiator 72 may be, but not limited to, a credit card, a debit card, a smart card, a smart device, a biometric device, and so forth. In an embodiment of the present invention, the transaction initiator 72 may be a biometric data of a user of the reporting system 70 that may be capable of initiating a transaction at the POST computer based device 14. In another embodiment of the present invention, the transaction initiator 72 may be the hand held computer based device 30 that may be used by a user of the reporting system 70 to initiate a transaction at the POST computer based device 14. Embodiments of the present invention are intended to include or otherwise cover any type of device and/or method, including known, related art, and/or later developed technologies that may be capable of initiating a transaction at the POST computer based device 14.

Further, the hand held computer based device 30 may be, but not limited to, a mobile device, a smart phone, a smart watch, a smart glass, a tablet computer, a portable computer, a laptop computer, a desktop computer, and so forth. Embodiments are intended to include or otherwise cover any type of hand held computer based device 30, including known, related art, and/or later developed technologies. According to embodiments of the present invention, the hand held computer based device 30 may enable a user to transmit and receive data within the reporting system 70. Embodiments are intended to include or otherwise cover any type of hand held computer based device 30, including known, related art, and/or later developed technologies. According to embodiments of the present invention, the user may be, but not limited to, a buyer, a retailer, a store-keeper, a gas station operator, and so forth.

Further, the hand held computer based device 30 may comprise one or more software applications such as, but not limited to, an ecommerce application, a location-based service application, a navigation application, a camera/imaging application, a media player application, a social networking application, a financial application, and so forth. Embodiments of the present invention are intended to include or otherwise cover any type of the software applications including known, related art, and/or later developed technologies. In an embodiment of the present invention, the hand held computer based device 30 may include a transaction application 16. The transaction application 16 may be configured to enable the user to access data and/or input data within the reporting system 70, according to embodiments of the present invention. Further, in an embodiment of the present invention, the transaction application 16 may be managed by the reporting platform 74 through the communication network 78. In an embodiment of the present invention, the reporting platform 74 may be a computer readable program provided in the hand held computer based device 30. In another embodiment of the present invention, the reporting platform 74 may be a computer readable program provided in the POST computer based device 14. In yet another embodiment of the present invention, the reporting platform 74 may be implemented as a hardware, a firmware, a software, or a combination thereof managed by a third-party service provider (not shown). Further, the reporting platform 74 is explained below in more detail in conjunction with FIG. 8.

The hand held computer based device 30 may further comprise a Near Field Communication device (NFC) device 31, according to an embodiment of the present invention. The NFC device 31 may be configured to enable the user using the hand held computer based device 30 to transmit and receive data to and from the POST computer based device 14 using the communication network 78. According to embodiments of the present invention, the NFC device 31 may be, but not limited to, a Bluetooth communication device, an infrared communication device, and so forth. Embodiments of the present invention are intended to include or otherwise cover any type of the NFC device 31 including known, related art, and/or later developed technologies that may be capable of transmitting and receiving data.

According to embodiments of the present invention, the hand held computer based device 30 further comprises a scanner 32 (interchangeably referred to as the optic device 32). The scanner 32 may be configured to enable the user to scan a computer readable data, according to embodiments of the present invention. The scanner 32 may be, but is not limited to, an optical sensor, a camera, Quick Response (QR) code scanner, a bar code scanner, and so forth. Embodiments of the present invention are intended to include or otherwise cover any type of the scanner 32 including known, related art, and/or later developed technologies that may be capable of enabling the user to scan a computer readable data. In addition, the hand held computer based device 30 may include, but not limited to, a processor (not shown), a memory (not shown) for storing the processor instructions, the transaction application 16, a control logic, and other application software providing secondary functionality, a plurality of input-output interfaces such as, but not limited to, a keyboard, a mouse, a printer, a display unit, and so forth, according to embodiments of the present invention.

The reporting system 70 further includes the POST computer based device 14, according to embodiments of the present invention. The POST computer based device 14 may be, but not limited to, a store kiosk, a desktop computer, a laptop, a smart device, a remotely operated device, a web browser, and so forth that may be available at a transaction point. Embodiments of the present invention are intended to include or otherwise cover any type of the POST computer based device 14 including known, related art, and/or later developed technologies that may allow a user to purchase a product or a service. In an embodiment of the present invention, the POST computer based device 14 may comprise a processor 12, the transaction application 16, a memory (not shown), and so forth. The processor 12 of the POST computer based device 14 may be configured to control the operations of a plurality of components of the POST computer based device 14. Further, the memory (not shown) may be configured to store the transaction application 16 and data related to the reporting system 70, according to embodiments of the present invention. The memory may be, but not limited to, a non-volatile memory, a volatile memory, an optical disk, a magnetic disk, a Random Access Memory (RAM), a Read-Only Memory (ROM), a Programmable Read-Only Memory (PROM), an Erasable Programmable Read-Only Memory (EPROM), an Electrically Erasable Programmable Read-Only Memory (EEPROM), a FLASH-EEPROM, and so forth. Embodiments of the present invention are intended to include or otherwise cover any type of the memory including known, related art, and/or later developed technologies that may be capable of data storage and retrieval.

The POST computer based device 14 may further comprise a NFC device 21, according to an embodiment of the present invention. The NFC device 21 may be configured to enable a data transmission and a data reception at the POST computer based device 14 using the communication network 78. According to embodiments of the present invention, the NFC device 21 may be, but not limited to, a Bluetooth communication device, an infrared communication device, and so forth. Embodiments of the present invention are intended to include or otherwise cover any type of the NFC device 21 including known, related art, and/or later developed technologies that may be capable of transmitting and receiving data.

According to embodiments of the present invention, the reporting system 70 further includes the remote processor 12B. In an embodiment of the present invention, the remote processor 12B may be, but not limited to, a credit card company remote server, a financial institution remote server, and so forth. The remote processor 12B may be configured to receive data and store data associated with the reporting system 70 in a database 80. According to embodiments of the present invention, the database 80 may be, but not limited to, a centralized database, a distributed database, a personal database, an end-user database, a commercial database, a Structured Query Language (SQL) database, a Non-SQL database, an operational database, a relational database, a cloud database, an object-oriented database, a graph database, and so forth. Embodiments of the present invention are intended to include or otherwise cover any type of the database 80 including known, related art, and/or later developed technologies that may be capable of data storage and retrieval.

Further, the reporting system 70 may comprise the third-party data storage 76 that may be capable of receiving data and storing data associated with the reporting system 70, in an embodiment of the present invention.

Figure 8:
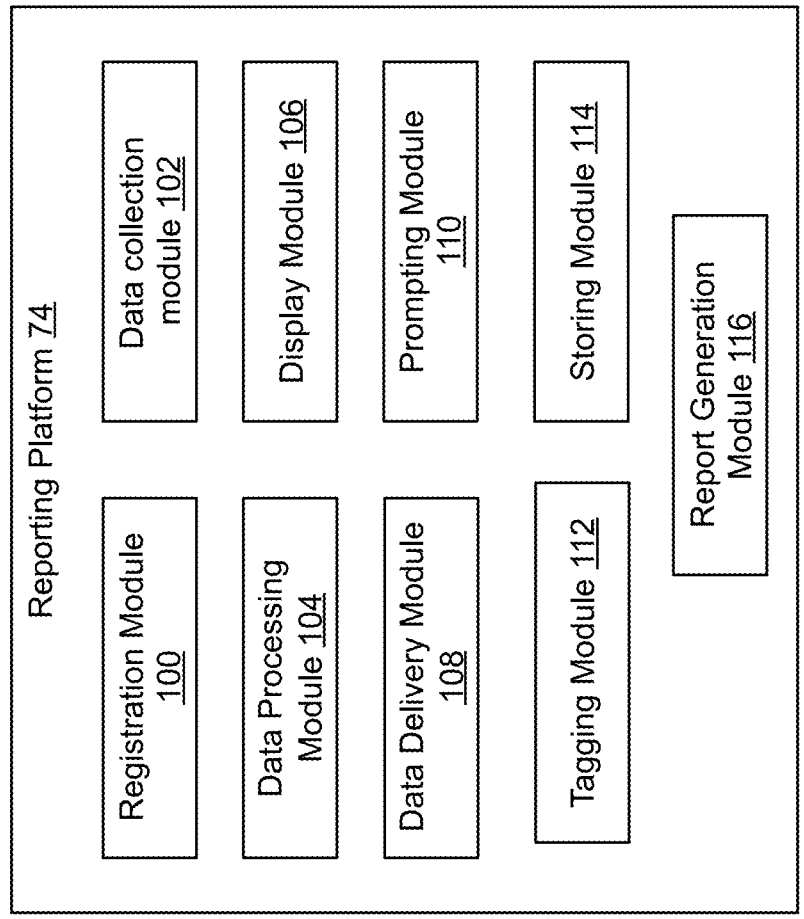
FIG. 8 depicts components of an expense reporting platform, according to embodiments of the present invention.

FIG. 8 depicts the components of the reporting platform 74, according to embodiments of the present invention. The reporting platform 74 may include, but not limited to, a registration module 100, a data collection module 102, a data processing module 104, a display module 106, a data delivery module 108, a prompting module 110, a tagging module 112, a storing module 114, and a report generation module 116, in an embodiment of the present invention.

The registration module 100 may be configured to enable a user of the reporting system 70 to register into the transaction application 16 by using the hand held computer based device 30. In another embodiment of the present invention, the registration module 100 may be configured to enable a user of the reporting system 70 to register into the transaction application 16 by using the POST computer based device 14. According to embodiments of the present invention, the user may be, but not limited to, a buyer, a retailer, a store-keeper, a gas station operator, and so forth. Further, the registration module 100 may be configured to display a login page (not shown) on the hand held computer based device 30, in an embodiment of the present invention. According to an embodiment of the present invention, the registration module 100 may enable the user to register into the transaction application 16 by providing user data. In an embodiment of the present invention, the user data may include, but is not limited to, a name, an address, a contact number, a social security number, a company name, an email ID, a shop name, an office address, and so forth. In another embodiment of the present invention, the registration module 100 may enable the user to register into the transaction application 16 by using a referral code. In an embodiment of the present invention, the referral code may comprise, but not limited to, a letter, a special character, a number, or a combination thereof. The referral code may be provided to the user by, but not limited to, a second user of the reporting system 70, a third party service provider, a financial institution, and so forth. The registration module 100 may be configured to prompt the user to enter the referral code through a referral input tab (not shown), in an embodiment of the present invention. In an embodiment of the present invention, the registration module 100 may be further configured to generate a unique coupon code if the registration module 100 determines that the referral code entered by the user is valid. The unique coupon code may be used by the user as a discount coupon for any transaction at the POST computer based device 14, according to an embodiment of the present invention.

Further, the registration module 100 may be configured to enable the user to generate a user login credential. The user login credential may comprise a user identifier (ID) and a password, in an embodiment of the present invention. According to embodiments of the present invention, the user ID and password may comprise, but not limited to, a letter, a special character, a number, or a combination thereof. The user login credential may be used by the user for logging into the transaction application 16 of the reporting system 70, in an embodiment of the present invention. Further, the registration module 100 may be configured to store the user registration data and the user login credential into the database 80 of the remote processor 12B, in an embodiment of the present invention. In another embodiment of the present invention, the registration module 100 may be configured to store the user registration data and the user login credential into the third party data storage 76. In yet another embodiment of the invention, the registration module 100 may be configured to locally store the user registration data and the user login credential into such as, the memory of the hand held computer based device 30 in addition to the database 80 or the third-party storage 76.

In another embodiment of the present invention, the registration module 100 may enable the user to register into the transaction application 16 using a social media account such as, but not limited to, a Facebook® account, a LinkedIn® account, a Twitter® account, and so forth. Further, the registration module 100 may be configured to extract user data from the social media account used by the user to register into the transaction application 16, according to embodiments of the present invention. In another embodiment of the present invention, the registration module 100 may be configured to extract user data from the hand held computer based device 30 used by the user to register into the transaction application 16.

According to embodiments of the present invention, the registration module 100 may enable the user to login into the transaction application 16 of the reporting system 70 by using the hand held computer based device 30. The registration module 100 may be configured to prompt the user to enter a user login credential for logging into the reporting system 70 through the transaction application 16. According to an embodiment of the present invention, the registration module 100 may be further configured to authenticate the user by comparing the entered user login credential with a plurality of user login credentials stored in the database 80 of the remote processor 12B. According to another embodiment of the present invention, the registration module 100 may be configured to authenticate the user by comparing the entered user login credential with a plurality of user login credentials stored in the third party data storage 76. In an embodiment of the present invention, if the registration module 100 determines that the entered user login credential matches with the user login credential stored in the remote processor 12B, then a user dashboard 31 is displayed on the hand held computer based device 30 (as shown in FIG. 1). In an embodiment of the present invention, the user dashboard 31 may comprise options such as, but not limited to, a scan-it tab 34, an assign-it tab 44, a client's tab 38, a report tab 40, a my info button 42, and so forth. The registration module 100 may be further configured to enable the user to add and/or edit the user data by initiating the my info button 42 provided on the user dashboard 31, according to embodiments of the present invention.

The data collection module 102 may be configured to enable the user of the reporting system 70 to add and/or edit a client data when the clients tab 38 is activated by the user.

The activation of the clients tab 38 may enable the data collection module 102 to display a client's page 39 (as shown in FIG. 2) on the hand held computer based device 30, in an embodiment of the present invention. The clients page 39 may comprise options such as, but not limited to, a client list 47, an add client tab 48, a delete client tab 49, a client name input tab 50, a purpose list 51, an add purpose tab 52, a delete purpose tab 53, a purpose input tab 54, a main tab 55, a scan-it tab 34, a make-it tab 56, a back tab 57, a save tab 58, and so forth. Further, the data collection module 102 may enable the user to add a new client data using the add client tab 48. Furthermore, the data collection module 102 may enable the user to edit a client data using the edit client tab 49, according to an embodiment of the present invention. In an embodiment of the present invention, the data collection module 102 may enable the user to alphabetically fetch a client data by selecting a desired alphabet from the client page 39. The data collection module 102 may be further configured to display a list of clients sorted alphabetically through the client input tab 50, in an embodiment of the present invention. The client input tab 50 may be a drop-down menu comprising the names of the clients already added by the user in the reporting system 70, according to embodiments of the present invention.

The data collection module 102 may enable the user to alphabetically fetch a purpose list by selecting a desired alphabet from the client page 39. The data collection module 102 may be further configured to display a purpose list sorted alphabetically through the purpose input tab 54, in an embodiment of the present invention. The purpose input tab 54 may be a drop-down menu comprising a list of purposes already added by the user in the mobile expense reporting system 70, according to embodiments of the present invention. Further, the data collection module 102 may enable the user to add a new purpose using the add purpose tab 52. Furthermore, the data collection module 102 may enable the user to edit a purpose using the edit purpose tab 53, according to an embodiment of the present invention. Further, the data collection module 102 may be configured to transmit the received data to the remote processor 12B, in an embodiment of the present invention. In another embodiment of the present invention, the data collection module 102 may be configured to transmit the received data to the third party data storage 76.

The data processing module 104 may be configured to determine an initiation of a transaction at the POST computer based device 14, in an embodiment of the present invention. The initiation of transaction at the POST computer based device 14 may be made by, but not limited to, the transaction initiator 72, the hand held computer based device 30, and so forth. In an embodiment of the present invention, the transaction initiator 72 and the hand held computer based device 30 may comprise an authorization data that may be provided by the remote processor 12B, a third party service provider, and so forth. The authorization data may be transmitted to the NFC device 21 of the POST computer based device 14 using the NFC device 31 of the hand held computer based device 30 for executing a transaction, according to an embodiment of the present invention. In another embodiment of the present invention, the authorization data may be directly provided by the remote processor 12B to the POST computer based device 14 for executing a transaction. In an embodiment of the present invention, if the data processing module 104 determines an initiation of a transaction at the POST computer based device 14, then the data processing module 104 may be configured to generate a transaction signal. The transaction signal may comprise a transaction data corresponding to the initiated transaction at the POST computer based device 14, in an embodiment of the present invention. The transaction data may include, but not limited to, a location of a transaction, a coupon detail, a referral code detail, a terminal identifier (ID), a product and/or service purchased, a merchant information, an amount, a date, a time, and so forth. In another embodiment of the present invention, the transaction data may include, but not limited to, a survey data associated with the POST computer based device 14, a demographic data associated with the POST computer based device 14, and so forth. The data processing module 104 may be configured to transmit the generated transaction signal to the data collection module 102. The data collection module 102 may be configured to transmit the received transaction signal to the remote processor 12B, according to an embodiment of the present invention. The transaction signal may be stored in the database 80 of the remote processor 12B, in an embodiment of the present invention.

Further, the data processing module 104 may be configured to generate a computer readable code based on the transaction signal. According to an embodiment of the present invention, the computer readable code may be, but not limited to, a two-dimensional bar code, a numeric-only barcode, an alphanumeric bar code, and so forth. In a preferred embodiment of the present invention, the computer readable code may be a Quick Response (QR) code 28 (as shown in the FIG. 3B). Embodiments of the present invention are intended to include or otherwise cover any type of the computer readable code including known, related art, and/or later developed technologies. The data processing module 104 may be further configured to transmit the generated QR code 28 to the display module 106, in an embodiment of the present invention. The display module 106 may be configured to display the received QR code 28 using the media display 22 (as shown in the FIG. 6) of the POST computer based device 14, in an embodiment of the present invention. In another embodiment of the present invention, the display module 106 may be configured to enable the printer 24 to print the generated QR code 28 on the paper 26.

In an embodiment of the present invention, the data delivery module 108 may be configured to enable NFC device 21 of the POST computer based device 14 to transmit the transaction signal to the NFC device 31 of the hand held computer based device 30 over the communication network 78. In another embodiment of the present invention, the data delivery module 108 may be configured to enable the user to scan the generated QR code 28 using the scanner 32 of the hand held computer based device 30. The data delivery module 108 may be further configured to convert the data embedded in the QR code 28 into human readable form for display on a transaction data screen 36 (as shown in the FIG. 3B) on the hand held computer based device 30, according to an embodiment of the present invention. In yet another embodiment of the present invention, the data delivery module 108 may be configured to enable the remote processor 12B to transmit the transaction signal to the hand held computer based device 30 over the communication network 78. The data delivery module 108 may be configured to display the transaction data screen 36 (as shown in the FIG. 3A) on the hand held computer based device 30. In an embodiment of the present invention, the transaction initiator 72 and the hand held computer based device 30 may comprise an authorization data that may be provided by the remote processor 12B, a third party service provider, and so forth. The authorization data may be transmitted to the NFC device 21 of the POST computer based device 14 using the NFC device 31 of the hand held computer based device 30 for executing a transaction, according to an embodiment of the present invention. In another embodiment of the present invention, the authorization data may be directly provided by the remote processor 12B to the POST computer based device 14 for executing a transaction. The user may be enabled to execute a transaction at the POST computer based device 14 of the transaction point by authorizing the received transaction data and the stored authorization data through the transaction data screen 36 displayed on the hand held computer based device 30. In an embodiment of the present invention, the data processing module 104 may be configured to enable the user to execute the transaction at the POST computer based device 14 of the transaction point when the authorization data is received at the computer based device 14 from the hand held computer based device 30 of the user. Further, the transaction data screen 36 may comprise options such as, but not limited to, an assign-it tab 44, a back tab 57, a save tab 58, and so forth.

The prompting module 110 may be configured to generate a prompt signal for the user to tag the transaction on determination of a reception of the transaction signal on the hand held computer based device 30 from the remote processor 12B, according to embodiments of the present invention. The prompt signal may comprise a plurality of survey questions corresponding to the products and/or the services and the transaction signal, in an embodiment of the present invention. The plurality of survey questions may be, but not limited to, "How often do you use the product or service?", "What would you improve if you could?", "Does the product help you achieve your goals?", "What gender do you identify as?", "What is your age?", "Please specify your ethnicity.", "Where is your home located?", "What is the highest level of education you have completed?", "Are you married?", and so forth. The prompt signal may be capable of notifying the user to tag the transaction data received through the transaction signal at the transaction point, in an embodiment of the present invention. Further, the prompting module 110 may be configured to prompt the user to submit answers corresponding to the plurality of survey questions received through the prompt signal at the transaction point. Further, the prompting module 110 may be configured to transmit the generated prompt signal to the hand held computer based device 30. In another embodiment of the present invention, the prompting module 110 may be configured to transmit the generated prompt signal to the POST computer based device 14. In an embodiment of the present invention, the prompting module 110 may be configured to prompt the user to tag the transaction or submit answers through a media display such as the media display 22 of the POST computer based device 14 at the transaction terminal. According to an embodiment of the present invention, the prompt signal may be transmitted as, but not limited to, a text message, a Short Message Service (SMS), a voice message, an email, and so forth. The prompt signal may be displayed as a screen overlay over an already running application on the hand held computer based device 30, according to an embodiment of the present invention.

The tagging module 112 may be configured to enable the user to tag the transaction data as, but not limited to, a personal transaction, a business transaction, and so forth. In an embodiment of the present invention, the tagging module 112 may be configured to enable the user to tag the transaction data when a prompt is displayed on the POST computer based device 14. In another embodiment of the present invention, the tagging module 112 may be configured to enable the user to tag the transaction data when a prompt is displayed on the hand held computer based device 30.

Further, the tagging module 112 may enable the user to tag the transaction data displayed on the transaction data screen 36 by activating the assign-it tab 44. In an embodiment of the present invention, the tagging module 112 may be configured to generate a tag signal when the assign-it tab 44 is activated by the user. In another embodiment of the present invention, the tagging module 112 may be configured to generate a tag signal when the tagging module 112 determines that the transaction data has been received by the hand held computer based device 30. The tag signal may display an assign-it screen 46 (as shown in the FIGS. 4A & FIG. 4B), according to embodiment so of the present invention. In an embodiment of the present invention, the tagging module 112 may be configured to enable the user to manually tag the transaction data. In another embodiment of the present invention, the tagging module 112 may be configured to automatically tag the transaction data based on, but not limited to, the answers provided by the user, a location of the transaction point, POS terminal 14 associated with a merchant, and so forth.

The tagging module 112 may be configured to enable the user to tag the transaction data with options such as, but not limited to, a client name, a purpose of transaction, a personal transaction, a business transaction, an air detail, an auto detail, a lodging detail, a meal detail, an entertainment, other details, and so forth. In another embodiment of the present invention, the tagging module 112 may enable the user to tag the transaction data by adding a note that may reflect an additional summary about the transaction. In yet another embodiment the tagging module 112 may enable the user to submit answers to at least three of the plurality of survey questions before proceeding to save a tag associated to the transaction data. According to embodiments of the present invention, the tagging module 112 may further enable the user to save the tagged transaction data based on the details entered by the user using the save tab 58 provided on the assign-it screen 46.

According to an embodiment of the present invention, the tagging module 112 may be configured to transmit the tagged transaction data and the answers corresponding to the plurality of survey questions to the database 80 of the remote processor 12B through the communication network 78. In another embodiment of the present invention, the tagging module 112 may be configured to transmit the tagged transaction data and the answers corresponding to the plurality of survey questions to the third party data storage 76 through the communication network 78. In an embodiment of the present invention, the tagging module 112 may be configured to enable the remote processor 12B to automatically tag the received transaction data based on the tagging details entered by the user and store the tagged transaction data into the database 80 of the remote processor 12B. The remote processor 12B may tag the received transaction data as one of a personal transaction or a business transaction. Further, the tagging module 112 may enable the user to navigate to a previous screen by using the back tab 57 provided on the assign-it screen 46. Furthermore, the tagging module 112 may enable the user to navigate to a user dashboard 31 by using the main tab 55 provided on the assign-it screen 46, according to embodiments of the present invention.

The storing module 114 may be configured to receive the tagged transaction data from the tagging module 112, and transforming and storing the transformed transaction data in a database. In an embodiment of the present invention, the database may be, but not limited to, the database 80 of the remote processor 12B, the third-party data storage 76, the memory or database of the hand held computer based device 30, and so forth.

The report generation module 112 may enable the user of the reporting system 70 to generate a report corresponding to any client selected by the user. In an embodiment of the present invention, the report generation module 112 may enable the user of the reporting system 70 to generate a report corresponding to any client selected by the user by using the POST computer based device 14. In another embodiment of the present invention, the report generation module 112 may enable the user of the reporting system 70 to generate a report corresponding to any client selected by the user by using the hand-held computer based device 30. The report may be fetched from the remote processor 12B and/or the third party data storage 76 based on criteria, such as but not limited to, a client name, a location of transaction, a POST computer based device ID, a date, a time, and so forth. According to embodiments of the present invention, the report may be generated using a third party application such as, but not limited to, a Quicken®, a QuickBooks®, a Peachtree® accounting, SoGoSurvey, Qualaroo, Zoho and so forth. Embodiments of the present invention are intended to include or otherwise cover any type of the accounting application including known, related art, and/or later developed technologies. Further, the report generation module 112 may be configured to transmit the generated report to the hand held computer based device 30. According to embodiments of the present invention, the generated report may be transmitted as, but not limited to, an email, a text message, a Short Messaging Service (SMS), and so forth. Embodiments of the present invention are intended to include or otherwise cover any type of the format for the generated report including known, related art, and/or later developed technologies.

According to embodiments of the present invention, the report generation module 112 may be further configured to access the answers submitted by the user corresponding to the plurality of survey questions stored at the remote processor 12B, the third-party data storage 76, or a local storage such as a memory of the hand held computer based device 30, or the POST computer based device 14. The report generation module 112 may be configured to generate recommendations of products and services for the user based on the answers submitted by the user corresponding to the plurality of survey questions. The report generation module 112 may be further configured to generate recommendation notification for the user that may be transmitted to the hand held computer based device 30, in an embodiment of the present invention. In another embodiment of the present invention, the recommendation notification may be transmitted to the POST computer based device 14 and displayed on the media display 22. According to embodiments of the present invention, the recommendation notification may be transmitted as, but not limited to, a text message, a Short Message Service (SMS), a voice message, and so forth. Embodiments of the present invention are intended to include or otherwise cover any type of a medium for transmitting a notification including known, related art, and/or later developed technologies.

FIG. 9 illustrates a process 200 for tagging a transaction data using the reporting system 70, according to an embodiment of the present invention.

At step 202, the reporting system 70 may determine an initiation of a transaction at a POST computer based device 14 of a transaction point by a user using a transaction initiator 72 and/or a hand held computer based device 30.

At step 204, the reporting system 70 may transmit a transaction data to the hand held computer based device 30 from the remote processor 12B using the communication network 78, in an embodiment of the present invention. In another embodiment of the present invention, the transaction data may be received when the user scans a QR code 28 displayed on a media display 22 of the POST computer based device 14 using the hand held computer based device 30.

At step 206, the reporting system 70 may enable the user to execute a transaction at the POST computer based device 14 based on the transaction data and an authorization data stored in the hand held computer based device 30 of the user.

At step 208, the reporting system 70 may prompt the user to tag the transaction data using, but not limited to, the hand held computer based device 30, the POST computer based device 14, and so forth.

At step 210, the reporting system 70 may determine if the transaction data is tagged. If the reporting system 70 determines that the transaction data is tagged then the process 200 may proceed to a step 212. Otherwise, the process 200 may return to the step 208.

At the step 212, the reporting system 70 may transmit the tagged transaction data to the remote processor 12B, in an embodiment of the present invention. In another embodiment of the present invention, the reporting system 70 may transmit the tagged transaction data to a third party data storage 76.

It is contemplated that the expense transaction software can be an application running in the background of the smart phone, for example, constantly running in background, which can be turned off and on, and capture transactional information data and transmit the same as they occur.

The above described invention is not intended to be limited by the above disclosure, but rather intended to encompass the full scope of the invention including modifications, improvements and derivations thereto.

What is claimed is:

1. A system for processing a transaction by a user at a transaction point, the system comprising:
a processor disposed at the transaction point, the processor being configured to detect an initiation of the transaction by the user and generate a transaction information data corresponding to the transaction;
a communication device associated with the processor, the communication device configured to transmit the transaction information data;
a remote processor configured to receive the transaction information data and store the transaction information data in a database;
a hand held device disposed in communication with the communication device, the hand held device configured to:
store transaction authority data;
receive the transaction information data from the communication device;
enable the transaction at the transaction point based on the transaction information data and the transaction authority data:
automatically displaying and prompting a user on said hand held device at said transaction point for tagging said transaction data at said transaction point with user input data to create tagged transaction information data,
receiving a user input data with tagging to a particular matter; and transmitting the user input to the remote processor, wherein the remote processor is further configured to tag the stored transaction information data in the database based on the user input data thereby transforming transaction information data on said remote database through electronic communication therebetween.

2. The system of claim 1, wherein said data delivery module configured to transmit the transaction information data between at least two of said processor disposed at the transaction point device, said remote processor, and a secondary computer based device of the user.

3. The system of claim 1, wherein said tagging module configured to enable the user to tag said transaction information data as one of a personal transaction, or a business transaction when a prompt is displayed on said processor disposed at the transaction point.

4. The system of claim 1, which further includes a report generation module configured to generate a report corresponding to any client selected by the user through said processor disposed at the transaction point.

5. The system of claim 1, wherein said processor disposed at the transaction point of the user is one of a hand held computer based device, a portable computer based device, a locally disposed computer based device.

6. The system of claim 1, said hand held device further configured to enable the user to register into a transaction application using a referral code.

7. The system of claim 1, wherein the hand held device is further configured to store the tagged transaction information data at one of a database of a remote processor and database of said processor disposed at the transaction point.

8. The system of claim 1, which further includes use of one of a credit card, a debit card, a smart card, a smart device, a biometric device, a local computer based device, a portable computer based device, or a hand held computer based device.

9. The system of claim 1, wherein the hand held device is further configured to prompt the user to submit answers corresponding to a plurality of survey questions.

10. The system of claim 1, wherein one of said processor devices disposed at the transaction point is further configured to prompt the user through a media display of the processor disposed at the transaction point at the transaction point.

11. The system of claim 1, wherein the processor disposed at the transaction point is further configured to enable the user to execute a transaction at the processor disposed at the transaction point of the transaction point when said authorization data is received at said processor disposed at the transaction point from said computer based device of the user.

* * * * *